United States Patent
Michel et al.

(10) Patent No.: US 12,429,337 B2
(45) Date of Patent: Sep. 30, 2025

(54) DEVICE AND METHOD FOR ESTIMATING THE LOCATION OF A VEHICLE GUIDED ALONG A CURVILINEAR GUIDE

(71) Applicant: EXAIL, Saint-Germain-en-Laye (FR)

(72) Inventors: Jean-Philippe Michel, Saint-Germain-en-Laye (FR); Stéphane Meyer, Saint-Germain-en-Laye (FR); Rosalie Fuchs, Saint-Germain-en-Laye (FR); Damien Ponceau, Saint-Germain-en-Laye (FR); Pierre D'Harcourt, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 104 days.

(21) Appl. No.: 18/577,007

(22) PCT Filed: Jul. 8, 2022

(86) PCT No.: PCT/EP2022/069198
§ 371 (c)(1),
(2) Date: Jan. 5, 2024

(87) PCT Pub. No.: WO2023/281108
PCT Pub. Date: Jan. 12, 2023

(65) Prior Publication Data
US 2024/0310173 A1    Sep. 19, 2024

(30) Foreign Application Priority Data
Jul. 8, 2021    (FR) ...................... 2107434

(51) Int. Cl.
*G01C 21/16* (2006.01)
*B61L 25/02* (2006.01)
*G01C 25/00* (2006.01)

(52) U.S. Cl.
CPC .......... *G01C 21/16* (2013.01); *B61L 25/025* (2013.01); *G01C 25/005* (2013.01)

(58) Field of Classification Search
CPC ...... G01C 21/16; G01C 25/005; B61L 25/025
See application file for complete search history.

(56) References Cited

U.S. PATENT DOCUMENTS

| 8,989,985 B2 | 3/2015 | Kimiagar et al. |
| 9,616,905 B2 | 4/2017 | Kernwein et al. |

(Continued)

FOREIGN PATENT DOCUMENTS

| EP | 1211152 B1 | 4/2006 | |
| EP | 3722182 A1 * | 10/2020 | ............ B61L 25/04 |

(Continued)

OTHER PUBLICATIONS

Samer S. Saab, "A Map Matching Approach for Train Positioning Part I: Development and Analysis", IEEE Transactions on Vehicular Technology, vol. 49, No. 2, Mar. 2000, pp. 467-475.

(Continued)

*Primary Examiner* — Andrew J Cromer
(74) *Attorney, Agent, or Firm* — NIXON & VANDERHYE

(57) ABSTRACT

This relates to a device and method for estimating the location of a guided vehicle along a guide, the device including: an attitude sensor of the guided vehicle providing values of attitude component measurements of the vehicle; a memory for storing virtual attitude beacon data including values of one or more of the attitude components of the virtual attitude beacon and at least one virtual attitude beacon attribute value, including at least one position attribute value of the beacon; and a processor configured to perform an activity of a virtual attitude beacon reader, le virtual attitude beacon reader comparing the stored virtual (Continued)

attitude beacon data and the vehicle attitude measurement values in order to detect an instance of a measurement value of the corresponding attitude component exceeding a value of an attitude component of the virtual attitude beacon data, the attitude component advantageously being the geographic heading.

20 Claims, 4 Drawing Sheets

(56) References Cited

U.S. PATENT DOCUMENTS

| | | |
|---|---|---|
| 2009/0187294 A1 | 7/2009 | James |
| 2021/0107546 A1* | 4/2021 | Ross ................ B61L 27/04 |

FOREIGN PATENT DOCUMENTS

| | | | |
|---|---|---|---|
| WO | 8912234 A1 | 12/1989 | |
| WO | 9837432 A1 | 8/1998 | |
| WO | WO-2018142056 A1 * | 8/2018 | ......... H04B 7/18513 |

OTHER PUBLICATIONS

International Search Report w/English translation for PCT/EP2022/069198 mailed Oct. 21, 2022, 8 pages.
Written Opinion for PCT/EP2022/069198 mailed Oct. 21, 2022, 7 pages.

* cited by examiner

[Figure 1]
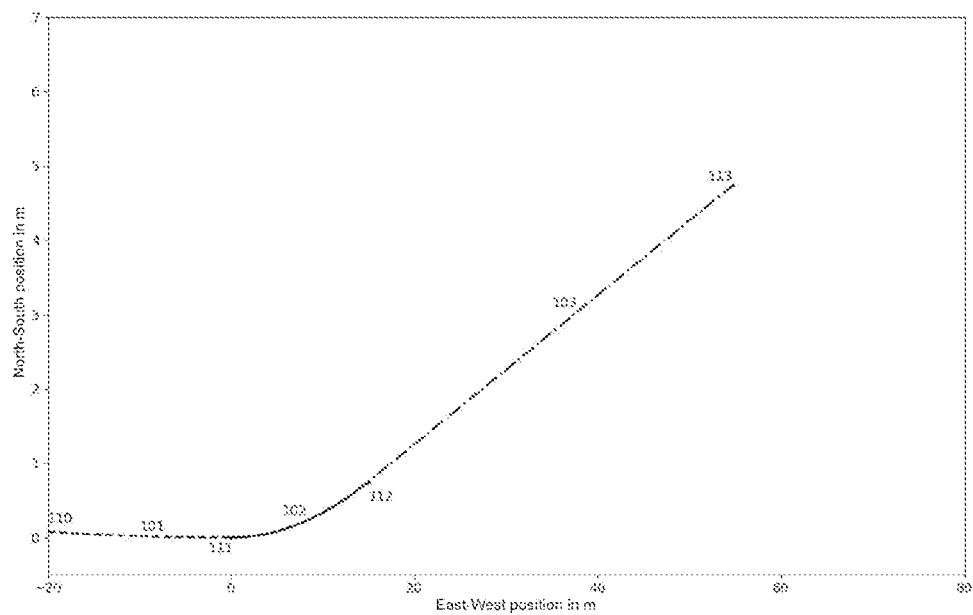
[Figure 2]
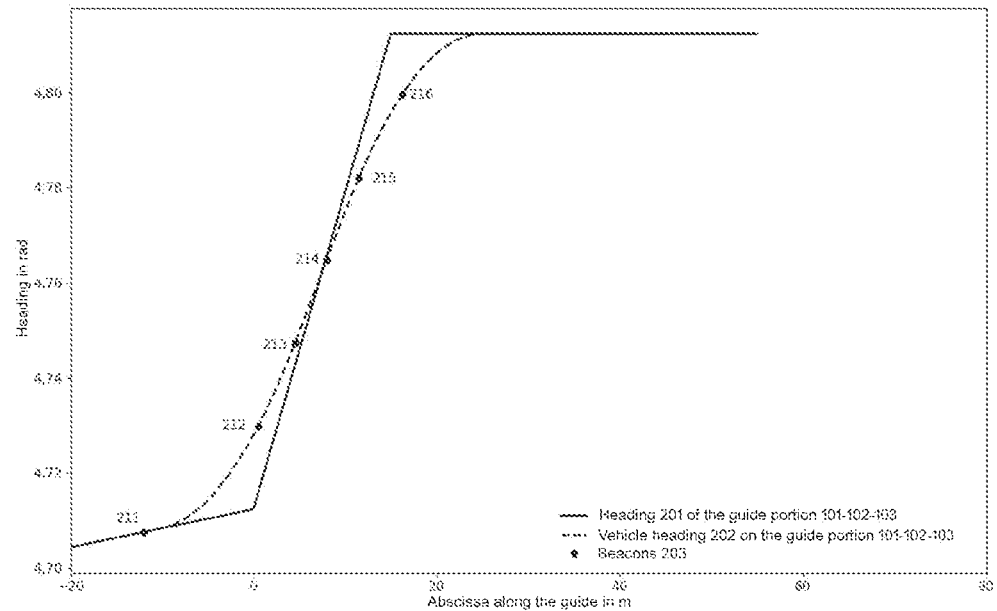

[Figure 3]
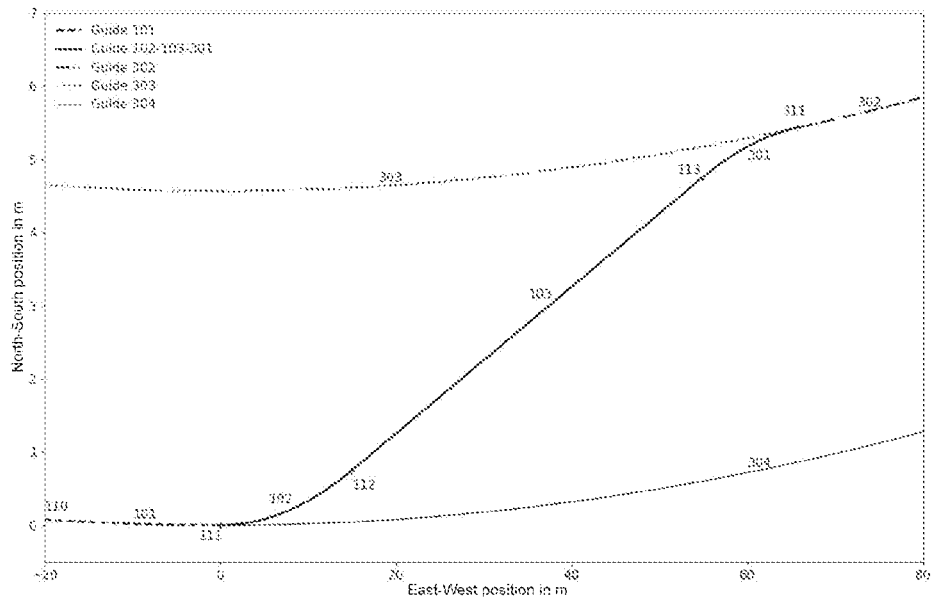
[Figure 4]
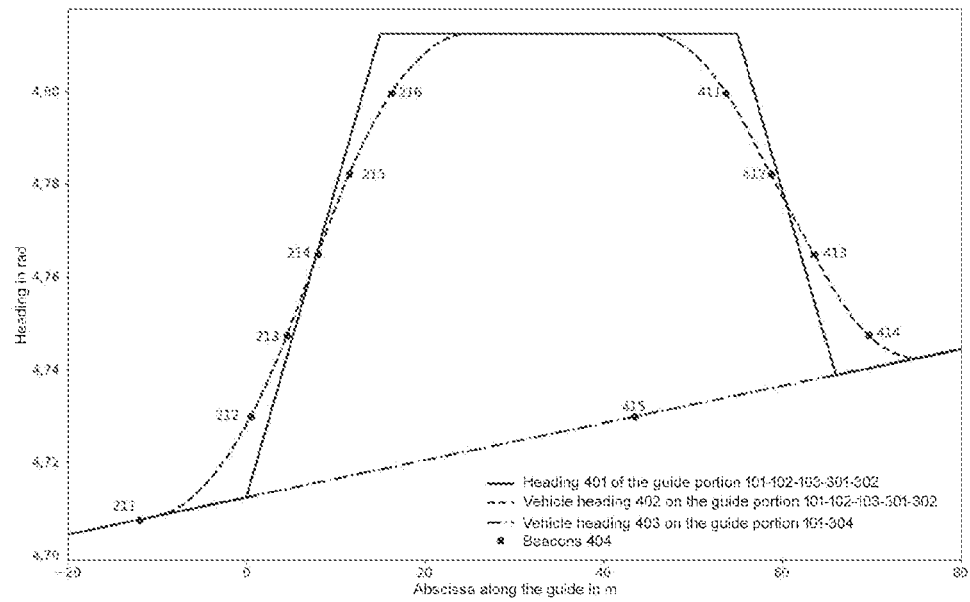

[Figure 5]
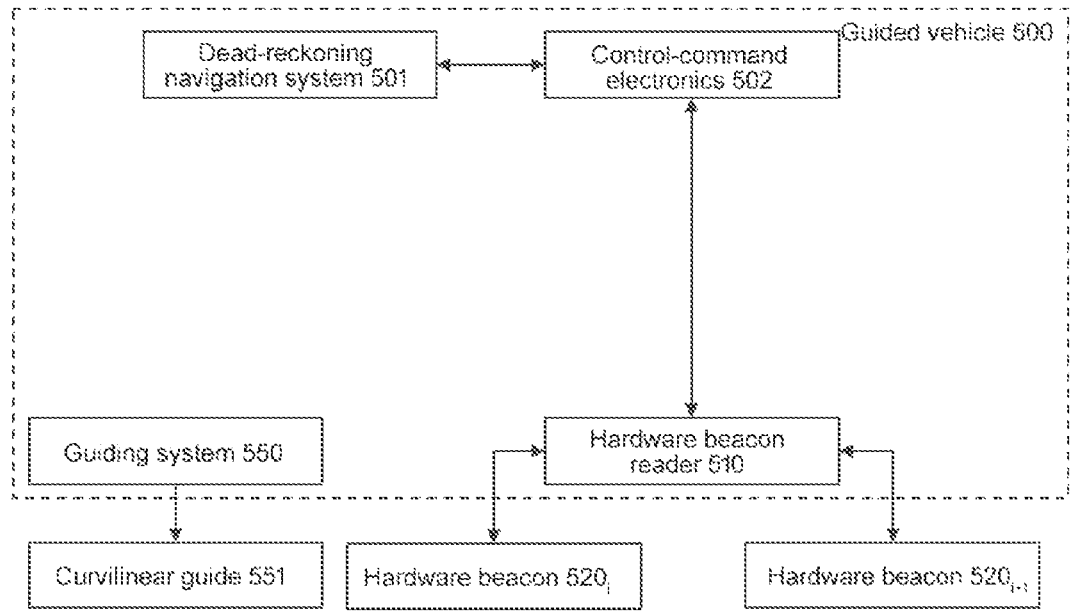
[Figure 6]
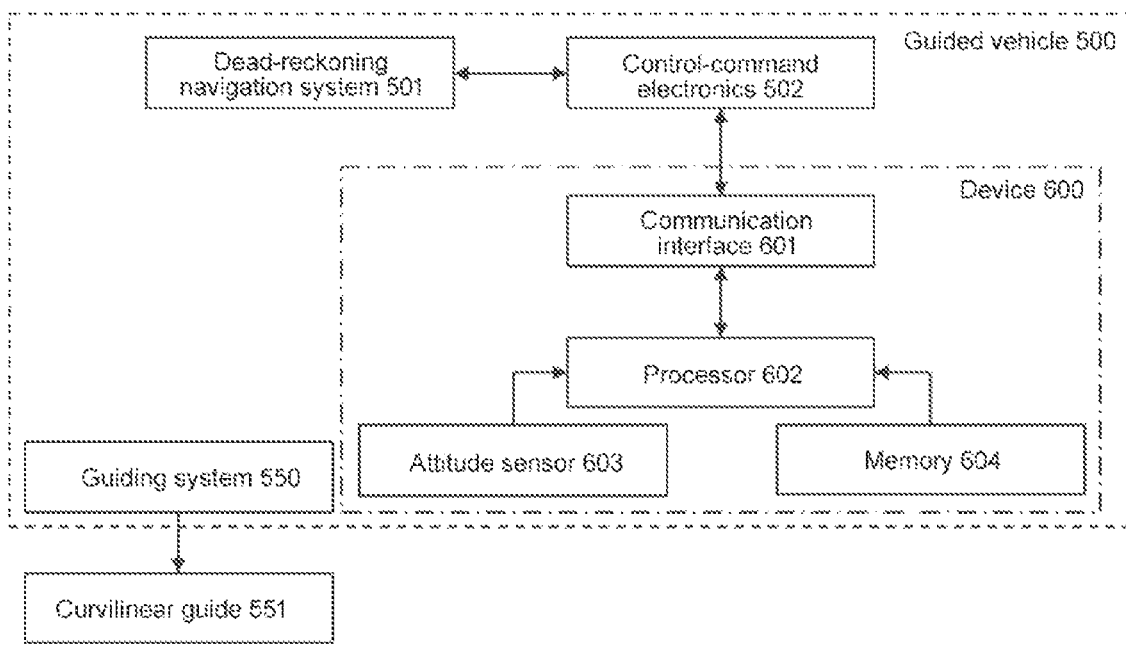

[Figure 7]
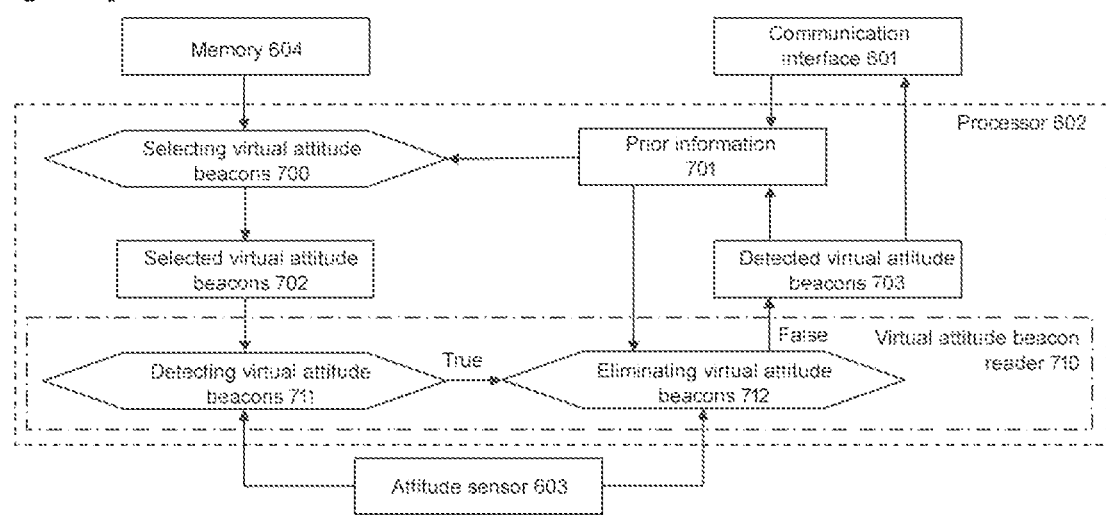

DEVICE AND METHOD FOR ESTIMATING THE LOCATION OF A VEHICLE GUIDED ALONG A CURVILINEAR GUIDE

CROSS-REFERENCE TO RELATED APPLICATIONS

This application is the U.S. national phase of International Application No. PCT/EP2022/069198 filed Jul. 8, 2022, which designated the U.S. and claims priority to FR 2107434 filed Jul. 8, 2021, the entire contents of each of which are hereby incorporated by reference.

TECHNICAL FIELD

The present invention generally relates to the field of navigation systems, in particular of the dead reckoning type, in which location recalibration is implemented. More particularly, it relates to a device and a method for estimating the location of a vehicle guided along a curvilinear guide.

Technological Background

The invention makes it possible to locate a sailing or circulating moving body (these terms being equivalent in the context of the invention) along a curvilinear guide.

Are considered in particular as curvilinear guides the railway tracks, the electromagnetic guides as for example for breeding robots or autonomous vehicles, or also the optronic curve-following systems, such as for example the motorway white lines.

The location of a moving body along a curvilinear guide is generally defined by a curvilinear abscissa from a reference point rather than by a geographical position.

In a railway context, these reference points can be for example transponders, generically referred to as hardware beacons, positioned along railway tracks or points and crossings. A hardware beacon reader taken on board rail vehicles operates to read these transponders as they are crossed. In order to determine the curvilinear abscissa travelled from the crossing of each of these transponders, the rail vehicles are equipped with various devices contributing to a dead-reckoning navigation system. They may be in particular wheel angular position sensors, sometimes called "phonic wheels", radars, inertial sensors/inertial unit or also satellite positioning systems.

With a drift in particular proportional to the distance travelled, these dead-reckoning navigation systems require regular recalibrations by passing over new transponders (subsequent transponders) they meet as they travel along the tracks, which involve a significant installation and especially maintenance costs. They themselves require very frequent periodic maintenance, resulting in a low availability of railway equipment. In addition, their performances remain limiting as regards the need of certain railway operators, for example in heavy traffic areas.

Thus, the invention especially relates to moving bodies the location determination of which uses dead-reckoning navigation systems.

This dead-reckoning navigation requires initial location as well as regular relocations, or recalibrations, for limiting the errors and uncertainties that would otherwise accumulate during the dead-reckoning navigation.

Uncertainties associated with these locations and relocations must in particular be well known for the dead-reckoning navigation system to be able to suitably take the recalibrations into account.

For dependability applications, it may also be necessary to know the level of protection offered by this location, i.e. the maximum error guaranteed, by an integrity control.

The dead-reckoning location of guided vehicles based on the coupling between measurement values from sensors on board the vehicle and a map database has already been the subject of several publications. This coupling can be made either in continuous or periodically, whether it is spatially or temporally. This coupling enables to improve the exactitude of the dead-reckoning navigation system and/or to identify the guide portion on which the vehicle is located and thus replaces some transponder functions.

The system proposed by the document EP 1 211 152 B1 requires speed measurements and an inertial quantity dependent on a geometric characteristic specific to the track at different time instants preceding the current time instant. The measurement values are coupled to a database consisted of said geometric characteristic specific to the track and its spatial derivative for different curvilinear abscissae in order to improve the calculation of the current curvilinear abscissa based on the previous curvilinear abscissa. According to its measurement axis in the rail vehicle, the gyrometer can either measure the yaw speed and be associated with the track curvature, or measure the roll speed and be associated with the track superelevation variations.

The document U.S. Pat. No. 8,989,985 B2 discloses a device and the corresponding method for determining the current position of a vehicle by measuring the attitude variations from a reference point for which the vehicle position is known and by comparing them to a map database containing in particular the guide attitude. These device and method do not allow in any way the vehicle position along the guide to be determined without prior position information, external to the system. These device and method, operating a map database specific to the guide and that does not take into account the deterministic attitude error generated by vehicle guidance, may not offer the performance required for recalibrating a high-performance dead-reckoning navigation system.

The two above documents use a map database to improve the exactitude to the dead-reckoning navigation system, but not to determine directly the position of the vehicle along the guide.

Several publications in the railway sector propose to use methods of correlation between two profiles representing the curvature or the relative heading as a function of the curvilinear abscissa. The first profile comes from a map database and the second one from the fusion between a yaw gyrometer and a speed sensor.

This is in particular the case of the article of Samer S. Saab: "A Map Matching Approach for Train Positioning", IEEE Transactions on Vehicular Technology, Vol. 49, No. 2, March 2000 (2000-03), pages 467-475, which develops an algorithm for recalibrating the current position of the rail vehicle upon detection of a curvature signature. These signatures correspond to curvature variations, in particular at switch points and cubic junctions, where the transition is made between an alignment and a full curve.

The document US 2009/0187294 A1 discloses a device and the corresponding method for identifying a confidence interval for a vehicle position at start-up thereof, using on-board position and attitude sensors, for example based on satellite positioning. This position is then compared with a map database containing in particular the guide position in order to identify the guide track on which the vehicle is located. When several tracks are identified, a profile of the heading or curvature evolution as a function of the distance travelled is estimated using on-board sensors, while the vehicle moves, up to obtain a signature enabling the track to be discriminated by comparison with the map database also containing the guide attitude.

The document WO 89/12234 A1 proposes a method based on the estimation, using inertial sensors, of a heading variation, as a function of the distance travelled in order to measure a profile of the route. This measured profile is then compared with profiles of heading variation as a function of the travelled distance, contained in a database.

The document U.S. Pat. No. 9,616,905 B2 focuses especially on the determination of the track followed when passing a switch by searching for the best correspondence between the measurement value of the heading variation as a function of the distance travelled and the different possible signatures associated with the bifurcation branches.

The four above-mentioned documents use a detection of signature of the variation of at least one of the three attitude components as a function of the distance travelled, requiring a relative displacement measurement. In the railway sector, such a signature can be observed in the track curvature variations. These variations require the passage of a switch or a cubic connection between two curves. This does not allow benefiting from the heading changes in the middle of a curve, which is the most common situation, to recalibrate the dead-reckoning navigation system.

The document US 2021/107546 A1 proposes a method for correlating trajectories, one defined by train heading variation measurement values as a function of time or of the distance travelled and the other by a railway track database including predetermined heading variations. The correlation works as soon as at least two heading variations are available but a single match is much more likely with a large number of heading variations rather than only two.

The document EP 3 722 182 A1 discloses a correlation method performed between inertial measurements and a railway track database based on the heading and the heading variation. This method has for object to determine the track followed by the train in the case where several railway tracks are in the vicinity thereof.

The document WO 98/37432 A1 discloses a correlation method between inertial measurements and a railway track database based on the heading. When passing a switch, for each possible track, a Kalman filter associated with the track is used to estimate the residuals of the differences between the measured heading and the track heading. A track is eliminated when the residual estimated in the associated Kalman filter exceeds a threshold. The track followed by the train is identified when only one possible track remains.

In practice, the quality of the sensors implemented and above all the way they are used in the state of the art does not allow obtaining an accurate geographical heading.

None of the documents identified in the state of the art exploits the crossing of at least one of the three attitude components memorized in a database by at least one of the three attitude components of a vehicle, to locate said vehicle. The three attitude components are the geographical heading, the yaw and the roll. It will be seen that, depending on the applications, only one of the components can advantageously be used for crossing search. This point research is different from a signature or correlation analysis with a geometrical shape stored into a memory. It will also be seen that, even if not all the components are used in the crossing search, unused components can advantageously be used to refine the results by eliminating crossings detected that should not have been.

In the following of the document, the words "beacon" and "virtual attitude beacon" will be used to denote a same virtual element and the word "hardware beacon" will be used to denote a hardware beacon and hence different from a virtual attitude beacon. A hardware beacon is typically a transponder that can be read by a hardware beacon reader taken on-board a vehicle.

DISCLOSURE OF THE INVENTION

The applicant proposes, with the present invention, a solution for easily determining the location of a vehicle, without necessarily having to read a hardware beacon, also known as a transponder, with a hardware beacon reader of the vehicle.

For that purpose, it is first proposed a device for estimating the location of a vehicle guided along a guide,
the device including:
an attitude sensor for the guided vehicle, the attitude sensor providing, while the vehicle moves, measurement values, in a local geographical reference system, for one or several attitude components of the guided vehicle, the attitude components including geographical heading, roll and yaw, and defining the orientation of a reference system attached to the vehicle with respect to the local geographical reference system,
a memory for storing virtual attitude beacon data, these virtual attitude beacons being located along the guide and oriented along the guide, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, the position attribute value(s) being used to locate the beacon,
a processor configured to perform an activity of virtual attitude beacon reader, the virtual attitude beacon reader comparing the stored virtual attitude beacon data and the vehicle attitude measurement values to detect a crossing of a virtual attitude beacon,
the guided vehicle location being provided by the position attribute value(s) of the beacon detected in the virtual attitude beacon reader.

In the following of the text, the words "heading and "geographical heading" are used indifferently to refer to the geographical heading.

Moreover, as regards the virtual attitude beacon data, which are used within the framework of the invention, they are described, for each virtual attitude beacon, as being, on the one hand, one or several values of one or several of the attitude components of said beacon and, on the other hand, at least one beacon attribute value, including at least one position attribute value of said beacon. This artificial separation for descriptive purposes is related to the fact that the attitude components are rather used for certain operations within the device and the other data are rather used for other operations within the device. It is however understood that it would be equivalent to consider that these virtual attitude beacon data comprise only beacon attribute values including at least attributes that are one or more values of one or more of the attitude components of said beacon and a position attribute value of said beacon.

Other non-limiting and advantageous features of the device according to the invention, taken individually or according to all the technically possible combinations, are the following:

- the guide is a curvilinear guide,
- the local geographical reference system is defined as being the reference system with the origin point at the current position of the dead-reckoning navigation system and whose axes are along the North, West, Top or North, East, Bottom directions,
- the stored position attribute value(s) enable to unambiguously locate the beacon,
- the guide is physical and is especially a railway track or an electromagnetic guide or a marking to be followed,
- the virtual attitude beacon reader activity is performed in a virtual attitude beacon reader of the processor,
- in the virtual attitude beacon reader, the processor is configured to detect crossed virtual attitude beacons,
- in the virtual attitude beacon reader, the processor is moreover configured to eliminate incorrectly detected crossed virtual attitude beacons,
- the processor is configured to detect virtual attitude beacons in the virtual attitude beacon reader by comparing the three attitude components of the stored virtual attitude beacon data and the vehicle attitude measurement values,
- the processor is configured to detect virtual attitude beacons in the virtual attitude beacon reader by comparing two of the three attitude components of the stored virtual attitude beacon data and the vehicle attitude measurement values,
- the processor is configured to detect virtual attitude beacons in the virtual attitude beacon reader by comparing only one of the three attitude components of the stored virtual attitude beacon data and the vehicle attitude measurement values,
- the processor is configured to detect virtual attitude beacons in the virtual attitude beacon reader by comparing only one of the three attitude components, which is the geographical heading, of the stored virtual attitude beacon data and the vehicle attitude measurement values,
- the processor is configured so that the virtual attitude beacon reader compares stored virtual attitude beacon data and vehicle attitude measurement values to detect a crossing of a value of an attitude component of the virtual attitude beacon data by a measurement value of a corresponding attitude component, a virtual attitude beacon for which a crossing has been detected having its attitude component value of its virtual attitude beacon data between two values of two successive measurements of the corresponding attitude component,
- the processor is configured to detect virtual attitude beacons in the virtual attitude beacon reader by comparing stored virtual attitude beacon data and vehicle attitude measurement values in order to detect a crossing of a value of an attitude component of the virtual attitude beacon data by a measurement value of a corresponding attitude component, a virtual attitude beacon for which a crossing has been detected having its attitude component value of its virtual attitude beacon data comprised between two values of two successive measurements of the corresponding attitude component,
- the processor is configured to detect virtual attitude beacons in a virtual attitude beacon detector of the virtual attitude beacon reader,
- in the case of an application to a vehicle on a ground guide, the processor is configured so that the virtual attitude beacon reader compares only one of the three attitude components, which is the geographical heading,
- in the case of an application to a vehicle on a ground guide, the processor is configured to detect virtual attitude beacons in the virtual attitude beacon reader by comparing only one of the three attitude components, which is the geographical heading,
- the ground is firm earth,
- in the case of a railway application, the processor is advantageously configured to detect virtual attitude beacons in the virtual attitude beacon reader by comparing only one of the three attitude components, which is the geographical heading,
- the virtual attitude beacon location attribute is a geodesic position that can be expressed by its latitude, longitude and altitude geographic coordinates,
- the virtual attitude beacon location attribute is a curvilinear distance with respect to a point of reference,
- in the case where the dead-reckoning navigation system implements an inertial unit, the virtual attitude beacon location attribute is advantageously a geodesic position to allow the system recalibration,
- in the case where the dead-reckoning navigation system implements a displacement sensor, the virtual attitude beacon location attribute is advantageously a curvilinear distance to a reference point to allow the system recalibration,
- the virtual attitude beacon data storage memory is in the vehicle,
- the virtual attitude beacon data storage memory is external to the vehicle and the device can access said virtual attitude beacon data storage memory,
- the processor is arranged in the vehicle,
- the processor is consisted of several units, at least one of the units being arranged in the vehicle and at least one of the other units being external to the vehicle and associated with the virtual attitude beacon data storage memory, which is external to the vehicle,
- the processor is further configured to calculate an uncertainty value and/or a level of protection associated with the guided vehicle location provided by the position attribute value(s) of the detected beacon,
- the level of protection is calculated based on the uncertainty,
- the level of protection corresponds to a multiple of the uncertainty,
- the processor is further configured to select, as a function of prior information, a subset of the stored virtual attitude beacon data, and so that the virtual attitude beacon reader uses only the stored virtual attitude beacon data subset,
- a virtual attitude beacon selector of the processor enables to select, as a function of prior information, a subset of the stored virtual attitude beacon data,
- the processor is further configured to select, as a function of prior information, a subset of the stored virtual attitude beacon data, and so that the virtual attitude beacon reader compares the stored virtual attitude beacon data subset and the vehicle attitude measurement values,
- the processor is further configured to select the subset of the stored virtual attitude beacon data as a function of at least one virtual attitude beacon attribute value of the virtual attitude beacon data, the virtual attitude beacon data further include a virtual attitude beacon attribute value that is a virtual attitude beacon identifier, the virtual attitude beacon data further include a guide attribute value that is a guide identifier on which the virtual attitude beacon is positioned, the virtual attitude beacon data further include at least one virtual attitude beacon attribute value that is a list of adjacent virtual attitude beacon identifiers, the beacon data of a given virtual attitude beacon further include a beacon attribute value that is the guide curvature at the position of said virtual attitude beacon, the beacon data of a given virtual attitude beacon further include beacon attribute values that are the curvilinear distances of said virtual attitude beacon to the adjacent virtual attitude beacons, as measured along the guides, the beacon data of a given virtual attitude beacon further include beacon attribute values that are the vectors connecting the geodesic position of said virtual attitude beacon to the geodesic positions of the adjacent virtual attitude beacons, the beacon data further include beacon attribute values that are the uncertainties linked to the beacon data values, the virtual attitude beacon reader is further configured to eliminate incorrectly detected virtual attitude beacons by comparing one or several values of one or several of the attitude components of the detected beacon and the vehicle attitude measurement values, the processor is configured to eliminate incorrectly detected virtual attitude beacons in an incorrectly detected virtual attitude beacon eliminator of the virtual attitude beacon reader, the virtual attitude beacon reader is further configured to eliminate incorrectly detected virtual attitude beacons by comparing the data of the detected beacons and prior information coming from a communication interface, the virtual attitude beacon reader is further configured to eliminate incorrectly detected virtual attitude beacons by comparing the attitude component(s) of the virtual attitude beacon that have not been used to detect virtual attitude beacons, in the case where the geographical heading is used to detect virtual attitude beacons, then the virtual attitude beacon reader is further configured to eliminate incorrectly detected virtual attitude beacons by comparing the detected virtual attitude beacon yaw and/or roll with the corresponding yaw and/or roll measured by the guided vehicle attitude sensor, the virtual attitude beacon reader is further configured to eliminate incorrectly detected virtual attitude beacons by comparing at least one beacon attribute value of the detected beacon with a rejection criterion, in the case where the beacon attribute value(s) of the detected beacon define the beacon position, the rejection criterion is a distance greater than a threshold between the position of the detected beacon and the estimated position of the vehicle, the stored virtual attitude beacon data include values of one or several of the beacon attitude components and beacon attribute values, said values of one or several of the beacon attitude components and the beacon attribute values being values common (or intrinsic, these terms being considered equivalent in this context) to a determined family of vehicles, the vehicles of a family having identical structural characteristics, the stored virtual attitude beacon data include values of one or several of the beacon attitude components and beacon attribute values, said values of one or several of the beacon attitude components and the beacon attribute values being values specific to the guide, in the case where the stored virtual attitude beacon data are values common to a determined family of vehicles and the guided vehicle does not belong to said determined family, then the processor configured to perform the activity of virtual attitude beacon reader compares corrected heading measurement values with the heading values of the virtual attitude beacon data, the corrected heading measurement values being heading measurement values produced by the guided vehicle attitude sensor and corrected for the vehicle speed, the difference between the centre distance of the vehicles of the family and the centre distance of the guided vehicle and the time variations of a rotation vector, the components of said rotation vector being the time derivative of the roll, yaw and heading measured by the guided vehicle attitude sensor, in the case where the stored virtual attitude beacon data are values specific to the guide, then the processor configured to perform the activity of virtual attitude beacon reader compares corrected heading measurement values with the heading values of the virtual attitude beacon data, the corrected heading measurement values being heading measurement values produced by the guided vehicle attitude sensor and corrected for the vehicle speed, the centre distance of the guided vehicle and the time variations of a rotation vector, the components of said rotation vector being the time derivative of the roll, yaw and heading measured by the guided vehicle attitude sensor, in the case where the stored virtual attitude beacon data are values common to a determined family of vehicles and the guided vehicle belongs to said determined family, then the processor configured to perform the activity of virtual attitude beacon reader compares heading measurement values with the heading values of the virtual attitude beacon data without having to correct the heading measurement values, in the case of an application implementing a vehicle having an inter-bogie distance or a centre distance, the identical structural characteristics of the vehicles are at least a same inter-bogie distance or centre distance of the guided vehicle, the stored virtual attitude beacon data including values of one or several of the beacon attitude components and beacon attribute values that are common to a determined family of vehicles have been obtained/collected by at least one vehicle of said family, the attribute values that are common (or intrinsic) to a determined family of vehicles are one or several values of the beacon position, value of the guide curvature at the beacon position, value of the curvilinear distance to the adjacent virtual attitude beacons, the beacon attribute values are specific (or intrinsic, these terms being considered as equivalent) to the curvilinear guide on which are placed the virtual attitude beacons, the values of one or several of the beacon attitude components are specific (or intrinsic) to the curvilinear guide on which are placed the virtual attitude beacons, the guided vehicle attitude sensor is arranged in or on the vehicle, without positioning or orientation constraints, the dead-reckoning navigation system of the guided vehicle is arranged in or on the vehicle, without positioning or orientation constraints, the attitude sensor orientation is corrected for misalignment angles in order to go back to the orientation of a reference system attached to the vehicle, the values of the three misalignment angles are configuration elements of the attitude sensor, the values of three misalignment angles are estimated by the dead-reckoning navigation system, the values of the beacon attitude components that are specific to the curvilinear guide on which are placed the virtual attitude beacons can be corrected or conversely and preferably the measurement values of the attitude component(s) of the guided vehicle can be corrected, to take into account the structural characteristics of the guided vehicle, the centre distance value of the guided vehicle is a configuration element of the processor, in particular a configuration parameter of a program executed by the processor, the guided vehicle centre distance value is estimated by the dead-reckoning navigation system, the centre distance value of the family of vehicles used to obtain/collect the beacon data is a configuration element of the processor, the centre distance value of the family of vehicles used to obtain/collect the beacon data is estimated by the dead-reckoning navigation system, the rotation vector includes components that are the time derivative of the roll, yaw and heading measured by the guided vehicle attitude sensor, the guided vehicle includes a dead-reckoning navigation means, the dead-reckoning navigation means is external to the device, the dead-reckoning navigation means implements an inertial unit, the dead-reckoning navigation means implements a displacement sensor, the device further includes a communication interface, the device is connected to a communication interface external to the device, the communication interface is connected to a dead-reckoning navigation means of the guided vehicle, the guided vehicle includes a control-command electronics external to the device, the communication interface of the device and the control-command electronics communicate with each other, the communication interface and the device are configured to provide the control-command electronics of the guided vehicle with data in a format identical to the data format of a hardware beacon reader, the dead-reckoning navigation means of the vehicle and the control-command electronics of the vehicle communicate with each other.

The invention also relates to a navigation system for a vehicle guided along a guide, the system including a dead-reckoning navigation means and the estimation system of the invention.

The invention finally relates to a method for estimating the location of a vehicle guided along a guide, which implements the described means of the invention.

More precisely, in the method for estimating the location of a vehicle guided along a guide, the following is implemented:

an attitude sensor for the guided vehicle, the attitude sensor providing, while the vehicle moves, measurement values, in a local geographical reference system, for one or several attitude components of the guided vehicle, the attitude components including geographical heading, roll and yaw, and defining the orientation of a reference system attached to the vehicle with respect to the local geographical reference system, a memory for storing virtual attitude beacon data, these virtual attitude beacons being located along the guide and oriented along the guide, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, the position attribute value(s) being used to locate the beacon, a processor configured to perform a virtual attitude beacon reader activity, method in which virtual attitude beacon data are stored into the memory, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, and wherein the attitude sensor provides, while the vehicle moves, measurement values, in a local geographical reference system, for one or several attitude components of the guided vehicle, and wherein the processor configured to perform a virtual attitude beacon reader activity compares the stored virtual attitude beacon data and the vehicle attitude measurement values to detect a crossing of a virtual attitude beacon, and wherein the guided vehicle location is provided by the position attribute value(s) of the beacon detected in the virtual attitude beacon reader.

Advantageously, in the method, in the virtual attitude beacon reader, a first operation is implemented to detect virtual attitude beacons and a second operation is implemented to eliminate incorrectly detected virtual attitude beacons.

BRIEF DESCRIPTION OF THE DRAWINGS

FIG. 1 shows the two-dimensional projection of a curvilinear guide portion comprising three curved guide sections (101, 102, 103) having different curvatures, FIG. 2 shows, on the one hand, the heading (continuous line 201) in radian (rad) of the curvilinear guide sections of FIG. 1 as a function of the curvilinear abscissa along these guide sections and, on the other hand, the heading (dashes 202) of an example of vehicle when the latter travels along the curvilinear guide sections, virtual attitude beacons (large points, wholly denoted 203) belonging to these curvilinear guide sections being also shown, FIG. 3 shows the two-dimensional projection of a complex curvilinear guide comprising in particular the curvilinear guide sections of FIG. 1, FIG. 4 shows the heading (402) of an example of vehicle when the latter travels through the curvilinear guide sections (101), (102), (103), (301) and (302) as well as the heading (403) of this same vehicle, when the latter travels through the curvilinear guide sections (101) and (304), virtual attitude beacons (large points, wholly denoted 404) belonging to these curvilinear guide sections being also shown, FIG. 5 shows a location system according to the state of the art for a guided vehicle and that uses a hardware beacon reader, FIG. 6 shows an embodiment of the guided vehicle location system according to the invention, and FIG. 7 shows a functional and structural diagram of an embodiment of the invention implementing a processor.

DETAILED DESCRIPTION OF AN EXEMPLARY EMBODIMENT

The following description in relation with the appended drawings, given by way of non-limiting examples, will allow a good understanding of what the invention consists of and of how it can be implemented.

First of all, certain elements of the invention are explained.

Virtual attitude beacons are implemented, which are directly or indirectly located along a guide travelled through by a vehicle and oriented along the guide. As regards the direct location and orientation along the guide and that corresponds to stored data specific to the guide, in the case of a railway track, the orientation can be for example the local orientation of one of the two rails (tangent to the rail) or the orientation of the track, in the middle of the track (tangent to the track, in the middle thereof). As regards the indirect location and orientation along the guide and that corresponds to stored data common to a family of vehicles, in the case of a railway track, the beacons are for example located at the center of the centre distance of the vehicles of the family and oriented along these vehicles, that for a given position of the vehicle on the track. The orientation and position of each virtual attitude beacon are defined by one or several value(s) of one or several attitude components of said beacon and by at least one beacon attribute value that is a position attribute value of said beacon. The beacon attitude components include the geographical heading. The beacon attribute values can include other information as, for example, beacon identification, of adjacent beacons, etc.

For a virtual attitude beacon whose data are specific to the guide, the geographical heading is the angle between a reference axis of the beacon and the North direction, the reference axis corresponding to the tangent to the guide at the beacon position. The yaw corresponds to the guide slope and the roll to the guide superelevation, in the case of a railway track, the outer rail being in elevated position in relation to the inner rail in a curve.

For a virtual attitude beacon whose data are common to a determined family of vehicles, the geographical heading, roll and yaw angles thereof are those of a vehicle of the family when, for example, the center of its centre distance coincides with the beacon position. For a vehicle, the geographical heading angle is the angle between the vehicle front axis and the true North direction. In a railway context, the front axis corresponds to a longitudinal axis of the body passing through the pivots of the two bogies. The left axis corresponds to the intersection of the plane defined by the body floor with a plane perpendicular to the front axis. The roll is the angle between the left axis and the horizontal plane. The yaw is the angle between the front axis and the horizontal plane.

In a railway context, for a guide (i.e. a track), having a constant curvature, the heading of a vehicle is equal to that of the track when placing at the point given by the orthogonal projection of the center of the vehicle centre distance to the track. Moreover, for a guide with slope and superelevation varying linearly, if the suspension effects are neglected, the vehicle roll and yaw are equal to those of the guide when placing at the point given by the orthogonal projection of the center of the vehicle centre distance to the guide. Thus, for specific guide layouts, the link between the geographic heading, roll and yaw angles of the vehicle and those of a virtual attitude beacon is direct and it is possible to directly compare the geographic heading, the roll or the yaw of the railway track where the virtual attitude beacon is located with the measured geographic heading, roll and yaw of a vehicle circulating on the railway track.

In the case where the stored virtual attitude beacon data are values common to a determined family of vehicles and the guided vehicle belongs to said determined family, then it is possible to compare directly the beacon geographic heading, roll and yaw with the geographic heading, roll and yaw measured by the guided vehicle attitude sensor, whatever the guide layout. In the other cases, the beacon geographic heading, roll and yaw data are not directly comparable to the measured data, unless specific guide layout.

In advanced implementation modes, calculations are made for correcting the attitude component(s) between the measurement values and those of the virtual attitude beacons to take into account in particular the suspension effect(s) and/or the conjoint effects of the guide layout (i.e. the track in a railway context) and the inter-bogie distance of the vehicle.

For example, still in a railway context, let's consider the case of a curvature variation of the guide (i.e. the track in the railway context). In this case, with virtual attitude beacon attitude components specific to the curvilinear guide, the heading being the angle between the tangent to the guide in the horizontal plane and the North direction and the heading measured in the vehicle being the angle between the centre distance and the North direction, then these angles are not equal, but it is possible to correct this difference due to the guide curvature variation. For that purpose, the processor 602 is moreover configured to correct the vehicle heading measurement values produced by the guided vehicle attitude sensor 603 by taking into account the guided vehicle centre distance, the vehicle speed and the time variation of a rotation vector, the components of said rotation vector being the time derivative of the roll, yaw and heading measured by the guided vehicle attitude sensor 603. After correction, the processor 602 performs an activity to detect 711 virtual attitude beacons in the virtual attitude beacon reader 710 by comparing corrected heading measurement values with the heading values of the virtual attitude beacon data.

Thus, to improve the accuracy, a solution consists in using a transfer function between the vehicle heading and the guide heading depending on the vehicle speed, the vehicle centre distance and the time variations of a rotation vector, in order to model and correct a part of the error due to such effects.

In the case where the beacon data are common to a family of vehicles different from that of the guided vehicle, then the transfer function uses the centre distances of the two families of vehicles.

In the principle of the invention in which a single attitude component is used to detect virtual attitude beacons in the virtual attitude beacon reader 710, the processor 602 compares the stored virtual attitude beacon data and the vehicle attitude measurement values to detect a crossing of one of the attitude components of one or several virtual attitude beacons by the measurement values of said at least one same attitude component, which, in other words, means that a virtual attitude beacon for which a crossing is detected has its value of said attitude component between two values of two successive measurements of the same attitude component of the guided vehicle.

By analogy, it can be considered that this virtual attitude beacon detection appears to produce a result in the same way as for a hardware beacon, a virtual attitude beacon being crossed when the guided vehicle, moving along the guide, passes the position of the virtual beacon defined by its position attribute value(s). However, the hardware and functional means implemented, in the one hand, for detecting virtual beacons in the invention, and on the other hand, for detecting hardware beacons, are different.

Generally, the invention applies to guided vehicles 500 evolving along guides, in particular curvilinear, of any nature. The vehicle guidance can be passive, e.g. rail guidance, or active, e.g. wire-guided or with visual cues, the vehicle having to orient its rolling means on a track.

The following examples are given for a rail guidance on a railway track in FIGS. 1 and 3. FIG. 1 shows an example of guide (rails) that is relatively simple in that it contains only zero-curvature section 103 or non-zero and constant curvature section 101, 102 in the horizontal plane and in that the guide heading is a monotonic function of its curvilinear abscissa. The section 101 extends from the place 110 to the place 111. The section 103 extends from the place 112 to the place 113. The section 102 connects the two preceding sections 101 and 103.

The vehicle includes a guided vehicle attitude sensor 603 that is arranged in or on the vehicle and that operates to take measurements of the vehicle attitude. There is no positioning or orientation constraints for the attitude sensor 603 in or on the vehicle. Indeed, the orientation of the attitude sensor 603 can be corrected for the misalignment angles with respect to a conventional orientation in order to provide the heading, roll and yaw angles of the vehicle according to the convention chosen. In certain cases, corrections are possible on the measurement values and/or the stored virtual attitude beacon data, herein the virtual attitude beacon attitude component value(s), in order to improve the comparison between the attitude components of the vehicle and those of the virtual attitude beacons, as a function of the fact that the stored virtual attitude beacon data belong to a determined family of vehicles or are specific to the guide and as a function of whether the guided vehicle belongs or not to said family.

FIG. 2 compares, as a function of the curvilinear abscissa, the guide heading in the middle of the vehicle and the vehicle heading. These two headings being monotonic functions of the curvilinear abscissa of the guide, the heading measurement uncertainty directly results in a measurement uncertainty of the curvilinear abscissa. For this example, a vehicle is considered, which is passively guided (for example by bogies) along the guide at two points space apart by 20 m. For certain applications, vehicles with different guidance can evolve on the same guide. That is the case for example of the railway applications for which the centre distance between bogie pivots of the guided vehicles may vary from simple to triple. In this example, the observed curvilinear abscissa error sometimes exceeds 5 m when using the curvilinear abscissa where the track heading is equal to the heading measured to position the vehicle.

To take these effects into account, the vehicle heading measurement values produced by the guided vehicle attitude sensor 603 can be corrected as indicated hereinabove.

A solution used within the framework of the invention consists in using information in relation with elements enabling a recalibration and that are common or intrinsic to certain families of vehicles. Thus, FIG. 2 shows elements enabling a recalibration, called virtual attitude beacons, which are specific to the type of guided vehicle and to the relevant guide 100. According to certain embodiments, the set 211, 212, 213, 214, 215 and 216 (generally denoted 203) consisted of these elements is stored into a memory 604 of the invention and used to estimate the vehicle location. The beacons are virtual beacons and correspond in practice to information or data advantageously stored into a memory 604 of the guided vehicle. This information, which can be virtual attitude beacon attitude component value(s) and/or virtual attitude beacons attribute values (e.g.: position, curvature, curvilinear distances to the adjacent virtual attitude beacons), are said "intrinsic" because they are usable by a family of vehicles having identical characteristics, in particular structural characteristics (e.g., a same inter-bogie spacing) because this information is obtained based on the passing on the guide of a vehicle belonging to this same family to obtain/collect the virtual attitude beacon data that will be used in the system of the invention.

The vehicle includes a dead-reckoning navigation system 501 that is arranged in or on the vehicle and that operates to estimate the vehicle position. There is no positioning or orientation constraints for the dead-reckoning navigation system 501 in or on the vehicle. Recalibration of the dead-reckoning navigation system 501 consists in comparing its position with the detected beacon location information. If the location is geodesic, this comparison uses the following corrections:

the lever arm between a point of the dead-reckoning navigation system 501 and a reference point of the vehicle, e.g. the center of the vehicle centre distance,
  a vector directed along the left axis of the vehicle and whose Euclidean norm depends on the guide curvature at the beacon position, on the guided vehicle centre distance and, if the beacon data are specific to a family of vehicles, on the centre distance of this family of vehicles.

The virtual attitude beacons are points along the guides, the position of which has been chosen on sections at which, preferentially, at least one of the three attitude components of the guide/railway varies. In the case of a vehicle moving on the ground, this is the geographical heading that has the greatest variations and that is used in the comparisons for crossing detection.

The device of the invention is a kind of hardware beacon reader simulator that implements virtual attitude beacons and determines which one it crosses during its travel along the guide based on the guided vehicle attitude component measurement values.

Indeed, the implementation of the invention does not require a hardware beacon to be read but is based on comparisons between a stored virtual attitude beacon attitude component value and a vehicle attitude component measurement value measured by an attitude sensor 603 of the vehicle. More precisely, in these comparisons, it is researched/detected if the value of a virtual attitude beacon attitude component is crossed by the vehicle attitude measurement values to determine what is or are the virtual attitude beacon(s) crossed by the moving vehicle. The term "detection" is to be understood in the sense of search, and the detection result may be positive (a virtual attitude beacon has been crossed according to the criteria of the invention) or negative (the virtual attitude beacon has not been crossed according to the criteria of the invention).

The data of a virtual attitude beacon are a group of data stored into a memory 604 that can be on board the vehicle or accessible by the vehicle, these data being attitude component and attribute value(s) in relation to the virtual attitude beacon. The virtual attitude beacon data of a beacon include at least one attitude component of the virtual attitude beacon, heading and/or yaw and/or roll, and one or several attribute values, including at least one position attribute value of the virtual attitude beacon. The attribute values of the virtual attitude beacon data of a virtual attitude beacon can further include a guide section (or guide) identifier corresponding to the guide section (or guide) in which the virtual attitude beacon is positioned. The virtual attitude beacon data of a virtual attitude beacon can further include another virtual attitude beacon attribute as for example a virtual attitude beacon identifier.

If a position attribute value of the virtual attitude beacon is the value of the guide distance separating the virtual attitude beacon from a reference point, then this value enables to recalibrate the vehicle location along the guide.

The vehicles can thus access these virtual attitude beacon data or even, preferably, include virtual attitude beacon data in a memory 604 belonging to the vehicle.

Therefore, in certain embodiments, all the virtual attitude beacon data of the all the virtual attitude beacons 203 are stored in a memory of the vehicle and are used to estimate the vehicle location along the guide: the detected virtual attitude beacon giving, by its virtual attitude beacon data, the position attribute value(s), here the vehicle location. In certain embodiments, all the virtual attitude beacon data of the virtual attitude beacons 203 are stored in a memory external to the virtual attitude beacons, e.g. a remote server, and to which the vehicle can access by a radio link in real time while moving and/or per batch or in totality before the vehicle moves (e.g. when pre-programming the vehicle route—train schedule—in the vehicle computer).

A significant advantage of the invention is that it can use many virtual attitude beacons to obtain frequent recalibrations at almost no cost because there is no need to place hardware beacons along the guide for that purpose, it is only necessary to know one or several values of one or several guide attitude components for virtual attitude beacons, at least the position attitude values of the virtual attitude beacons and vehicle attitude measurement values produced by an attitude sensor 603.

The invention also applies in the case of guide portions that are more complex than those presented up to now and comprising, for example, with inclined or variably curved sections. The invention also applies to guides including deviating guide portions as shown in FIG. 3, where a piece of equipment (switch in a railway context) located at the place 111 operates to deviate the vehicle travelling along the guide 101 in the Est direction, towards the guide 102 or, as an alternative, towards the guide 304. Still in this example, equivalently, a piece of equipment (switch in a railway context) located at the place 311 operates to deviate the vehicle travelling along the guide 302 in the West direction, towards the guide 301 or, as an alternative, towards the guide 303. It is to be noted that this description relating to a passive vehicle, i.e. following only passively the guides and deviation equipments like a locomotive on railway tracks and switches, can also apply to vehicles able to choose/select and take a guide among several ones at a place where a deviation is possible, in the same way as a self-propelled carriage on steered wheels following ground markings on a rolling surface, this choice being preprogrammed or locally proposed to the vehicle.

FIG. 4 shows recalibration elements that are also virtual attitude beacons and that are specific to the type of guided vehicle and to the relevant guide. The virtual attitude beacons 211, 212, 213, 214, 215 and 216 correspond to the travel of the vehicle along the guide sections 101, 102 and 103, as shown in FIG. 3. The virtual attitude beacon 415 corresponds to the travel by the vehicle along the guide section 304.

Still in FIG. 4, the virtual attitude beacons 411, 412, 413 and 414 correspond to the travel of the vehicle along the sections 103, 301 and 302. Here again, when placed sparingly and judiciously, they enable a relevant map recalibration of a dead-reckoning navigation system 501.

With the conventional/known location system of FIG. 5, including a guiding system 550 along a curvilinear guide 551 and using a dead-reckoning navigation system 501, and which provides inaccurate location information for the guided vehicle 500, it is possible, in this guide example of FIG. 4, to made the difference between the virtual attitude beacons 212 and 415 that are more than 40 m apart along the East-West component or curvilinear abscissa component. In the case of a rail vehicle, the guiding system 550 corresponds for example to bogies and the curvilinear guide 551 to railway rails.

This location system of FIG. 5 of the state of the art, which implements a control-command electronics 502 within the vehicle, can obtain the location information by means of a hardware beacon reader 510 adapted to read hardware beacons $520_i$, $520_{i+1}$ (transponders). The hardware beacon reader 510 provides location information provided by the hardware beacon for recalibrating the dead-reckoning navigation system 501. It is to be noted that, in FIG. 5, two hardware beacons $520_i$ and $520_{i+1}$ are schematized in relation with the hardware beacon reader 510 simply to symbolize the fact that the hardware beacon reader 510 has been able to read these two hardware beacons while the vehicle moves, but this is not a simultaneous reading of two hardware beacons.

In FIG. 6 corresponding to the implementation of the invention, the guided vehicle 500 includes a device 600 that provides location information for recalibrating the dead-reckoning navigation system 501. However, contrary to FIG. 5, this information is not obtained by a hardware beacon reader but by comparisons in a processor 602 between virtual attitude beacon data stored into a memory 604 and vehicle attitude measurement values produced by an attitude sensor 603 to search/detect a crossing of an attitude component value of the virtual attitude beacon data by a measurement value of a corresponding attitude component. The processor 602 is connected to the control-command electronics 502 through a communication interface 601 of the device 600.

The "crossing of an attitude component value of the virtual attitude beacon data by a measurement value of a corresponding attitude component" is defined as the case in which both values of two consecutive attitude measurements surround said attitude component value of the virtual attitude beacon data, which is then qualified as the crossed virtual attitude beacon data, and it is considered that a crossed virtual attitude beacon has been detected and that the corresponding virtual attitude beacon has been crossed. The corresponding virtual attitude beacon is then known, with its virtual attitude beacon data and thus its attributes, including at least the position attribute value(s), can for example be the guide distance value separating the virtual attitude beacon from a reference point, the latter data allowing the recalibration of the vehicle location along the guide.

Several calculation/comparison methods can be implemented for that purpose, for example using two values of two successive measurements and searching if they surround the attitude component used among the data of a virtual attitude beacon.

The validity time of the location relocation is determined as the estimated crossing time. The latter can be calculated based on the two values of two successive attitude measurements, denoted respectively $\psi_p$ and $\psi_c$, which enables to detect the crossing and the attitude component value of the crossed virtual attitude beacon data, denoted $\psi_b$, for example assuming a linear variation over time of the attitude component value measured between the 2 measurement time, respectively denoted $t_p$ and $t_c$. The validity time of the recalibration, denoted $t_b$, is then written:

$$t_b = t_p + (\psi_b - \psi_p)/(\psi_c - \psi_b) \times (t_c - t_p).$$

In a preferred embodiment, the crossing detection is based on a single attitude component, the heading for the vehicle remaining on the ground and the two other attitude components may serve to eliminate an incorrectly detected virtual attitude beacon. This reduces the risk of false positives.

Still to reduce the risk of false positives (incorrect crossing detections), the comparisons can also be performed on a subset of the stored virtual attitude beacon data as mentioned hereinafter.

In another embodiment, the processor 602 is configured in such a way that the virtual attitude beacon reader 710 compares the attitude component values of a stored virtual attitude beacon and the vehicle attitude measurement values to detect a crossing by comparing one, two or three of the three attitude components in the means for detecting virtual attitude beacons 711 of the virtual attitude beacon reader 710. For example, the crossing can be detected when a function of these values, such as the Euclidean distance between a vector of the beacon attitude values and a vector of the measured values, reaches a minimum or becomes lower that a predetermined threshold. The crossing detection by obtaining a minimum requires at least three successive attitude measurements whereas a single attitude measurement is sufficient in the case of a comparison to a threshold. The function can also be given by the maximum of the absolute values of the components of a vector obtained by the difference between the vector of the beacon attitude values and a vector of the measured attitude values. These absolute values can possibly be weighted before calculating the maximum.

In some cases, the comparisons for crossing search/detection resulting from a new attitude measurement value can result in the detection of crossing of more than one crossed virtual attitude beacon. In such cases, in which the attitude measurement values of one of the attitude components cross the value of the same attitude component from the data of several virtual attitude beacons in memory, the processor 602 sends to the communication interface 601 data associated with all the detected virtual attitude beacons or data calculated from a fusion of the detected virtual attitude beacons.

In order to be able to position the most virtual attitude beacons possible and to avoid at best that the device of the invention produces several crossed virtual attitude beacons for a same vehicle attitude measurement value, it is preferable to choose, in the virtual attitude beacon data, among the possible virtual attitude beacon attitude components, those for which the ratio between the possible value interval and the uncertainty between the measurement values and the values of the associated virtual attitude beacon attitude component is maximum. This component will be preferably memorized or used if the memory 604 and/or the calculation capacities of the processor 602 are constrained.

In the case where the attitude component used is the heading, and the virtual attitude beacon is located on a guide portion with a constant curvature, the heading uncertainty may result in a location uncertainty in the horizontal plane due to the curvature. This heading uncertainty comes from measurement errors of the attitude sensor 603, a heading error of the virtual attitude beacon data, the guided vehicle heading repeatability in a portion of the guide and potential heading corrections if the heading of the virtual beacon memorized data has not been determined by a vehicle having the same structural characteristics as the guided vehicle. The location uncertainty usable to recalibrate the dead-reckoning navigation system 501 also includes the location uncertainty of the virtual attitude beacon.

The processor 602 can also be configured to calculate the level of protection associated with the obtained vehicle location estimation, wherein this level of protection can be calculated for example based on the uncertainty.

For the comparisons implemented within the framework of the invention, it is therefore possible to use the current vehicle attitude measurement value and the vehicle attitude measurement value just preceding in time, and it is therefore necessary to temporarily memorize the latter that will be subsequently (after a new vehicle attitude measurement) replaced by the current attitude measurement value, that will then become the preceding one.

In an embodiment, the frequency of reception of the attitude measurement values by the virtual attitude beacon reader 710 is lower than the measurement frequency of the attitude sensor 603, the frequency of the comparisons and searches for crossing corresponding to the frequency of reception: at each new vehicle attitude measurement value received, the comparisons and searches for crossing are performed on the virtual attitude beacon data.

The attitude sensor 603 provides a measurement value of at least one attitude component of the vehicle, in a local geographical reference system. This local geographical reference system is defined as being the reference system with the origin point at the current position of the dead-reckoning navigation system 501 and whose axes are along the North, West, Top directions or along the North, East, Bottom directions, in another convention.

This sensor can be, for example, an inertial navigation unit or an AHRS ("Attitude and Heading Reference System").

The device 600 of the invention thus includes a processor 602. The processor 602 is functionally connected to the memory 604 and to the attitude sensor 603 for measuring the vehicle attitude. The processor 602 is thus configured/programmed to obtain periodically, from the attitude sensor 603, a measurement value of at least one virtual attitude component then to compare it to the virtual attitude beacon data of the memory 604 with the search for a crossing of virtual attitude beacon data value by the attitude measurement values. The device 600 includes a communication interface 601, an attitude sensor 603 and a memory 604 that are in communication with the processor 602.

By comparing FIGS. 5 and 6, it is understood that the device 600 and the hardware beacon reader 510 provide the same type of recalibration information and thus that it is also possible to implement both in parallel. This may relate, for the hardware beacons, those which can be read and provide directly (preprogrammed hardware beacon transmitting its information to the vehicle hardware beacon reader) or indirectly (through stored hardware beacon data, after the pairing between the hardware beacon and the corresponding hardware beacon data) recalibration information, in practice provide directly or indirectly one or several position attribute values, in particular the value of guide distance separating the hardware beacon from a reference point.

It is understood that, within the framework of the invention, the stored virtual attitude beacon data and the vehicle attitude measurement values have to be compared within a processor 602 in a repetitive manner, searching for a surrounding of virtual attitude beacon data of each virtual attitude beacon by two values of two successive attitude measurements, which also corresponds to a search for crossing. Now the virtual attitude beacons and hence virtual attitude beacon data can be very numerous and even correspond to virtual attitude beacons that will not be concerned by the vehicle route. It can hence be preferable, rather than making comparisons over all the stored virtual attitude beacon data, to limit the virtual attitude beacon data object of the comparison to a subset.

Likewise, rather than a fixed frequency, it may be provided to optimize the frequency of the measurements and/or the comparisons, as a function of criteria, for example as a function of the vehicle speed, due to the fact that a hardware beacon has just been read by the hardware beacon reader (which causes a new measurement), of the estimated distance to the adjacent virtual attitude beacon(s), etc.

It is understood that for an effective comparison to take place, the component of the attitude measurement value and that of the virtual attitude beacon data have to be of the same type, for example heading or yaw or roll for the virtual attitude beacon data and the measurement values, the heading of the virtual attitude beacon data being compared to the headings of the values of two consecutive/successive measurements, etc.

In an embodiment, the device or method of the invention can restrict the virtual attitude beacon data that have to be implemented among all the virtual attitude beacon data, thanks to the use of guided vehicle movement authorization information. Therefore, a subset of virtual attitude beacon data can be selected among all the stored or accessible virtual attitude beacon data, by keeping only the subset of those which are associated with the guide sections concerned by the movement authorization. It results therefrom calculation saving because the map recalibration elements, i.e. in practice the stored or accessible virtual attitude beacon data, that are used are only a subset of all the virtual attitude beacon data. It is to be noted that the establishment of the subset of virtual attitude beacon data can be done before the vehicle moves (e.g. when preprogramming the vehicle route—train schedule—in the vehicle computer), or periodically or per batch (at the entry on a new route) or in real time while the vehicle moves.

It is understood that it may however be useful to have virtual attitude beacon data that are not only limited to the guide sections of the movement authorization but to other ones that correspond to virtual attitude beacons that could be met in the event of the vehicle having to be diverted or parked (e.g. temporary parked or diverted in contraflow—Permanent contraflow installation (IPCS in French)—to let another vehicle pass).

In the embodiment shown in FIG. 7, prior information 701 is used to make an a priori selection 700 from among the accessible or stored virtual attitude beacons in order to reduce the number of virtual attitude beacon data to be compared to the vehicle attitude measurement values in the virtual attitude beacon reader 710. The so-selected virtual attitude beacons/virtual attitude beacon data are stored within a subset of virtual attitude beacon data that is used by the virtual attitude beacon reader 710, in particular to detect virtual attitude beacons 711.

This selection can be made as described hereinabove and for example as a function of the planned vehicle route—train schedule—to define a subset of virtual attitude beacon data corresponding to virtual attitude beacons liable to be met by the vehicle.

In FIG. 7 are schematized in the processor 602, the prior information 701, the selected virtual attitude beacons 702 that are a subset of the virtual attitude beacons (in practice, a subset of virtual attitude beacon data) and the detected virtual attitude beacons 703 to symbolize results of operation and/or tests that are performed within the processor 602. The processor 602 is a programmable computer device and that is programmed to execute the invention. These elements 701, 702 and 703 can be transient information within the processor 602 or be stored in a specific memory 604. The operations and/or tests are symbolized by the functions "selecting virtual attitude beacons" 700, "detecting virtual attitude beacons" 711 and "eliminating virtual attitude beacons" 712 that are incorrectly detected (elimination of false positives), the latter two being a "virtual attitude beacon reader" 710. According to the embodiment, the virtual attitude beacon reader 710 can include only the function "detecting virtual attitude beacons" 711 or, then, the combination of the two functions "detecting virtual attitude beacons" 711 and "eliminating virtual attitude beacons" 712. Indeed, if the function "detecting virtual attitude beacons" 711 does not produce false positives (detection of crossing of a virtual attitude beacon that is not relevant), the detected virtual attitude beacons 703 can be obtained directly by the function 711. This may be obtained in particular by an efficient function "selecting virtual attitude beacons" 700. In case of detection of false positives by 711, the function "eliminating virtual attitude beacons" 712 is then useful to suppress the detections of crossing that relate to non-relevant virtual attitude beacons.

It is to be noted that, in FIG. 7, which thus combines functional/procedural and structural representations, the term "virtual attitude beacons" is used instead of "virtual attitude beacon data" to simplify the figure, but the operations performed (in particular, the selections and comparisons for crossing search/detection) apply in fine to the virtual attitude beacon data. It is possible, in the case where the virtual attitude beacon 50 data include an attribute of adjacent virtual attitude beacon identifiers, that the latter is used to select virtual attitude beacons in the blocks "selecting virtual attitude beacons" 700. More generally, the prior information can be received by the interface 601 and/or deduced from the previous detected virtual attitude beacons 703. The prior information may include only identifiers of virtual attitude beacons adjacent to the previous detected virtual attitude beacons 703.

The frequency of operation of the step making it possible to select virtual attitude beacons 700 is generally lower than that of the virtual attitude beacon reader 710. The virtual attitude beacon reader 710 includes means 711 for detecting virtual attitude beacons and for eliminating 712 incorrectly detected virtual attitude beacons by comparison between measurement values of the attitude sensor 603 and virtual attitude beacon data. The means 712 for eliminating virtual attitude beacons uses certain of the measured attitude components to eliminate incorrectly detected virtual attitude beacons and thus refine the information sent back to the communication interface 601. It is to be noted that this means 712 for eliminating virtual attitude beacons is optional in the virtual attitude beacon reader 710.

When, and only when, the means 711 for detecting virtual attitude beacons of the processor 602 detects that the attitude component measurement values cross the value of the same attitude component of one or several virtual attitude beacons selected 702, previously among the virtual attitude beacons that are in the memory 604, the processor 602 sends back to the communication interface 601, if the means 712 for eliminating incorrectly detected virtual attitude beacons accepts it, information relating, according to the case, to the virtual attitude beacon detected or to all the detected virtual attitude beacons 703 or, in certain embodiments, information calculated from a fusion of the information relating to all the detected virtual attitude beacons 703. A detected virtual attitude beacon is thus a beacon or virtual attitude beacon data for which a crossing has been detected during the comparison between the virtual attitude beacon data and the vehicle attitude measurement values in the virtual attitude beacon reader 710 made in the processor 602.

In an embodiment, it is possible to complete the prior information with a list of virtual attitude beacons adjacent to that of the newly detected virtual attitude beacon, these adjacent virtual attitude beacons being virtual attitude beacons that can be reached along the guide followed by the vehicle after the passage on the newly detected virtual attitude beacon, without meeting other ones. In the case of FIG. 4, the virtual attitude beacons 211, 213 and 415 are adjacent to the virtual attitude beacon 212. The beacon 212 itself belongs to its list of adjacent beacons in order to manage the situation in which the vehicle reverses.

In an embodiment, prior information is the guide portion travelled by the guided vehicle. In dependability applications, for example, it would be the guide portion corresponding to the vehicle movement authorization.

In another embodiment, prior information is an approximate geographical location of the vehicle.

In certain cases, the status of the guide equipment (switch, turntable, traverser . . . ) for route changes is not necessarily known in advance and prior information must therefore include the virtual attitude beacons liable to be met on the various possible routes. For example, in FIG. 3, in the case of a guided vehicle evolving on the section 101 towards the East, the status of the guide equipment 111 being unknown, the dead-reckoning navigation system 501 does not know if it will evolve towards the guide 102 or towards the guide 304 and hence the prior information will include at least a number of the first virtual attitude beacons of the two possible routes.

The virtual attitude beacon data preferably contain the attitude values required to use the prior information and possibly the other attitude component(s) than that used in the comparisons for crossing search. Typically, for the comparison for crossing search, among the beacon data, the geographical heading is used. The two other attitude components, yaw and roll, of the virtual attitude beacon data can be used in the means 712 for eliminating incorrectly detected virtual attitude beacons. The means 712 for eliminating incorrectly detected virtual attitude beacons can also use other beacon attribute values. For example, using the position attribute values of said beacon to eliminate from the detected beacons those whose position is too far from the estimated position of the vehicle. For example, using the track identifier attribute value to eliminate from the detected beacons those whose track identifier does not correspond to the travelled track.

In certain embodiments, the means of the invention further provide to the control-command electronics 502 information about the travelled guide section. In a railway application, it is a track identifier.

This track identifier can, according to the case, be obtained from the detected virtual attitude beacon data 703 provided by the virtual attitude beacon reader 710 of the processor 602 (in case of presence in the stored virtual attitude beacon data of a track identifier attribute).

The vehicle can possibly include a hardware beacon reader for reading information contained in the hardware beacons and this reader is adapted to the types of hardware beacons met during the vehicle travel.

The physical reading of a hardware beacon can be advantageously used as a complement of the means of the invention, for example for redundancy safety checks or to add hardware beacons for guide sections in which none of the three attitude components vary.

In this case, the hardware beacon reader are directly provided by the hardware beacons by being transmitted to the vehicle while they are read by a hardware beacon reader of the vehicle, each hardware beacon being preprogrammed with information that are at least the value of the guide distance separating the hardware beacon from a reference point, and possibly the hardware beacon identifier and/or the guide section identifier of the guide on which it is placed.

The invention can thus advantageously be implemented in a dead-reckoning navigation system 501 and enable an efficient recalibration thereof.

The invention claimed is:

1. A device for estimating the location of a vehicle guided along a guide, the device including:
 a guided vehicle attitude sensor, the attitude sensor providing, while the vehicle moves, measurement values, in a local geographical reference system, for one or several attitude components of the guided vehicle, the attitude components including geographical heading, roll and yaw, and defining the orientation of a reference system attached to the vehicle with respect to the local geographical reference system,
 a memory for storing virtual attitude beacon data, these virtual attitude beacons being located along the guide and oriented along the guide, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, the position attribute value being used to locate the beacon,
 a processor configured to perform an activity of virtual attitude beacon reader, the virtual attitude beacon reader comparing the stored virtual attitude beacon data and the vehicle attitude measurement values to detect a crossing of a virtual attitude beacon, the guided vehicle location being provided by the position attribute value of the beacon detected in the virtual attitude beacon reader.

2. The estimation device according to claim 1, wherein the processor is configured so that the virtual attitude beacon reader compares the stored virtual attitude beacon data and the vehicle attitude measurement values to detect a crossing of a value of an attitude component of the virtual attitude beacon data by a measurement value of a corresponding attitude component, a virtual attitude beacon for which a crossing has been detected having its attitude component value of its virtual attitude beacon data between two values of two successive measurements of the corresponding attitude component.

3. The estimation device according to claim 1, wherein, in the case of an application to a vehicle on a ground guide, the processor is configured so that the virtual attitude beacon reader compares only one of the three attitude components, which is the geographical heading.

4. The estimation device according to claim 1, wherein the stored virtual attitude beacon data include values of one or several of the beacon attitude components and beacon attribute values, said values of one or several of the beacon attitude components and the beacon attribute values being values common to a determined family of vehicles, the vehicles of a family having identical structural characteristics, or being values specific to the guide.

5. The estimation device according to claim 4, wherein, in the case where the stored virtual attitude beacon data are values common to a determined family of vehicles and the guided vehicle does not belong to said determined family, then the processor configured to perform the activity of virtual attitude beacon reader compares corrected heading measurement values with the heading values of the virtual attitude beacon data, the corrected heading measurement values being heading measurement values produced by the guided vehicle attitude sensor and corrected for the vehicle speed, the difference between the centre distance of the vehicles of the family and the centre distance of the guided vehicle (603) and the time variations of a rotation vector, the components of said rotation vector being the time derivative of the roll, yaw and heading measured by the guided vehicle attitude sensor.

6. The estimation device according to claim 4, wherein, in the case where the stored virtual attitude beacon data are values specific to the guide, then the processor configured to perform the activity of virtual attitude beacon reader compares corrected heading measurement values with the heading values of the virtual attitude beacon data, the corrected heading measurement values being heading measurement values produced by the guided vehicle attitude sensor and corrected for the vehicle speed, the centre distance of the guided vehicle and the time variations of a rotation vector, the components of said rotation vector being the time derivative of the roll, yaw and heading measured by the guided vehicle attitude sensor.

7. The estimation device according to claim 1, wherein in the virtual attitude beacon reader, the processor is further configured to eliminate incorrectly detected crossed virtual attitude beacons.

8. The estimation device according to claim 7, wherein the virtual attitude beacon reader is further configured to eliminate incorrectly detected virtual attitude beacons by comparing one or several values of one or several of the attitude components of the detected beacons and the vehicle attitude measurement values.

9. The estimation device according to claim 7, wherein the virtual attitude beacon reader is further configured to eliminate incorrectly detected virtual attitude beacons by comparing the data of the detected beacons and prior information coming from a communication interface.

10. The estimation device according to claim 7, wherein the processor is further configured to select, as a function of prior information, a subset of the stored virtual attitude beacon data, and so that the virtual attitude beacon reader compares the stored virtual attitude beacon data subset and the vehicle attitude measurement values.

11. The estimation device according to claim 10, wherein the selection of the beacon data subset is made using the list of identifiers of the beacons adjacent to the last beacon detected.

12. The estimation device according to claim 2, wherein in the virtual attitude beacon reader, the processor is further configured to eliminate incorrectly detected crossed virtual attitude beacons.

13. The estimation device according to claim 12, wherein the processor is further configured to select, as a function of prior information, a subset of the stored virtual attitude beacon data, and so that the virtual attitude beacon reader compares the stored virtual attitude beacon data subset and the vehicle attitude measurement values.

14. The estimation device according to claim 13, wherein the selection of the beacon data subset is made using the list of identifiers of the beacons adjacent to the last beacon detected.

15. The estimation device according to claim 1, wherein the processor is further configured to calculate an uncertainty value and/or a level of protection associated with the guided vehicle location provided by the position attribute value of the detected beacon.

16. The estimation device according to claim 1, wherein the processor is further configured to select, as a function of prior information, a subset of the stored virtual attitude beacon data, and so that the virtual attitude beacon reader compares the stored virtual attitude beacon data subset and the vehicle attitude measurement values.

17. The estimation device according to claim 16, wherein the selection of the beacon data subset is made using the list of identifiers of the beacons adjacent to the last beacon detected.

18. The estimation device according to claim 2, wherein the processor is further configured to select, as a function of prior information, a subset of the stored virtual attitude beacon data, and so that the virtual attitude beacon reader compares the stored virtual attitude beacon data subset and the vehicle attitude measurement values.

19. The estimation device according to claim 18, wherein the selection of the beacon data subset is made using the list of identifiers of the beacons adjacent to the last beacon detected.

20. A method for estimating the location of a vehicle guided along a guide, wherein the following is implemented:
  an attitude sensor for the guided vehicle, the attitude sensor providing, while the vehicle moves, measurement values, in a local geographical reference system, for one or several attitude components of the guided vehicle, the attitude components including geographical heading, roll and yaw, and defining the orientation of a reference system attached to the vehicle with respect to the local geographical reference system,
  a memory for storing virtual attitude beacon data, these virtual attitude beacons being located along the guide and oriented along the guide, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, the position attribute value being used to locate the beacon, a processor configured to perform an activity of virtual attitude beacon reader, method in which virtual attitude beacon data are stored into the memory, the virtual attitude beacon data of a given beacon including at least orientation and location information about said beacon, said information being one or several values of one or several of the attitude components of said beacon and at least one beacon attribute value, including at least one position attribute value of said beacon, the attitude components being a maximum of three, including a geographic heading, and wherein the attitude sensor provides, while the vehicle moves, measurement values, in a local geographical reference system, for one or several attitude components of the guided vehicle, and wherein the processor configured to perform an activity of virtual attitude beacon reader compares the stored virtual attitude beacon data and the vehicle attitude measurement values to detect a crossing of a virtual attitude beacon, and wherein the guided vehicle location being provided by the position attribute value of the beacon detected in the virtual attitude beacon reader.

* * * * *